US009500896B2

(12) United States Patent
Dunn et al.

(10) Patent No.: US 9,500,896 B2
(45) Date of Patent: Nov. 22, 2016

(54) COOLING SYSTEM FOR LIQUID CRYSTAL DISPLAY

(71) Applicant: Manufacturing Resources International, Inc., Alpharetta, GA (US)

(72) Inventors: William Dunn, Alpharetta, GA (US); Marcos Diaz, Alpharetta, GA (US)

(73) Assignee: MANUFACTURING RESOURCES INTERNATIONAL, INC., Alpharetta, GA (US)

( * ) Notice: Subject to any disclaimer, the term of this patent is extended or adjusted under 35 U.S.C. 154(b) by 41 days.

(21) Appl. No.: 14/740,865

(22) Filed: Jun. 16, 2015

(65) Prior Publication Data

US 2015/0362792 A1    Dec. 17, 2015

Related U.S. Application Data

(60) Provisional application No. 62/012,785, filed on Jun. 16, 2014.

(51) Int. Cl.

| | |
|---|---|
| *G02F 1/1333* | (2006.01) |
| *F21V 8/00* | (2006.01) |
| *A47F 11/10* | (2006.01) |
| *A47B 81/06* | (2006.01) |
| *A47F 3/04* | (2006.01) |
| *G09F 9/35* | (2006.01) |
| *G09F 23/06* | (2006.01) |
| *G09F 23/00* | (2006.01) |

(52) U.S. Cl.
CPC ......... *G02F 1/133385* (2013.01); *A47B 81/06* (2013.01); *A47F 3/043* (2013.01); *A47F 3/0434* (2013.01); *A47F 11/10* (2013.01); *G02B 6/0063* (2013.01); *G02B 6/0085* (2013.01); *G09F 9/35* (2013.01); *G09F 23/06* (2013.01); *G02B 6/0095* (2013.01); *G09F 2023/0025* (2013.01)

(58) Field of Classification Search
CPC ...................................................... G02F 1/1333
See application file for complete search history.

(56) References Cited

U.S. PATENT DOCUMENTS

| | | | |
|---|---|---|---|
| 7,922,381 B2 | 4/2011 | Han | |
| 8,683,745 B2 | 4/2014 | Artwohl | |
| 2002/0075552 A1* | 6/2002 | Poll | E06B 3/66 359/275 |
| 2002/0187575 A1* | 12/2002 | Maruyama | H01L 51/5259 438/33 |
| 2005/0265019 A1 | 12/2005 | Sommers | |
| 2007/0151274 A1 | 7/2007 | Roche | |
| 2007/0171647 A1 | 7/2007 | Artwohl | |
| 2008/0055534 A1 | 3/2008 | Kawano | |
| 2008/0284942 A1 | 11/2008 | Mahama | |

(Continued)

FOREIGN PATENT DOCUMENTS

CN    202815379    3/2013

*Primary Examiner* — Timothy L Rude
(74) *Attorney, Agent, or Firm* — Standley Law Group LLP

(57) ABSTRACT

The exemplary embodiments herein provide a transparent liquid crystal display (LCD) assembly having a glass panel with an LCD panel placed in front of the glass panel. A light guide may be positioned between the LCD panel and the glass panel and the light guide may have an edge. A substrate containing a plurality of LEDs is preferably positioned adjacent to the edge of the light guide and a thermal plate is preferably attached to both the substrate and the glass panel. The thermal plate may contain two portions which are substantially perpendicular to each other, where one of the portions is substantially parallel to the glass panel. In some embodiments, the LCD may be sandwiched in between a pair of glass panels, held opposite one another by a spacer.

17 Claims, 6 Drawing Sheets

(56) References Cited

U.S. PATENT DOCUMENTS

| | | |
|---|---|---|
| 2009/0002990 A1 | 1/2009 | Becker |
| 2010/0162747 A1 | 7/2010 | Hamel |
| 2011/0083460 A1 | 4/2011 | Thomas |
| 2011/0116231 A1 | 5/2011 | Dunn |
| 2013/0016296 A1* | 1/2013 | Fujita .................. H01L 27/322 349/42 |
| 2013/0063326 A1 | 3/2013 | Riegel |
| 2013/0265525 A1 | 10/2013 | Dunn |
| 2013/0271696 A1 | 10/2013 | Dunn |
| 2014/0078407 A1 | 3/2014 | Green |
| 2014/0085564 A1* | 3/2014 | Hendren .......... G02F 1/133385 349/58 |
| 2014/0104538 A1 | 4/2014 | Park |
| 2014/0144083 A1 | 5/2014 | Artwohl |

\* cited by examiner

COOLING SYSTEM FOR LIQUID CRYSTAL DISPLAY

CROSS-REFERENCE TO RELATED APPLICATIONS

This application claims priority to U.S. Provisional Application No. 62/012,785 filed on Jun. 16, 2014 which is herein incorporated by reference in its entirety.

TECHNICAL FIELD

Embodiments generally relate to cooling systems for transparent liquid crystal displays (LCD) and traditional LCDs.

BACKGROUND OF THE ART

Display cases are used in a number of different retail establishments for illustrating the products that are available for sale. In some instances these display cases may be coolers or freezers which are placed in grocery stores, convenience stores, gas stations, restaurants, or other retail establishments. In other instances these display cases may be non-refrigerated transparent containers used in a jewelry or watch store, bakery, deli, antique shop, sporting goods store, electronics store, or other retail establishments. While the design and appearance of the product itself does provide some point-of-sale (POS) advertising, it has been found that additional advertising at the POS can increase the awareness of a product and in turn create additional sales.

Most retail establishments already contain some POS advertising, and depending on the type of establishment the proprietor may want to limit the amount of 'clutter' in the retail area—resulting in a very limited space for additional POS advertising. It has now become desirable to utilize the transparent glass that is typically placed in display cases with additional POS advertising. Most notably, it has been considered that transparent LCDs may be positioned along with the transparent glass and could display additional advertising materials while still allowing a patron to view the products inside the display case.

SUMMARY OF THE EXEMPLARY EMBODIMENTS

An exemplary embodiment provides a cooling system for a transparent LCD assembly. LEDs are preferably arranged along the top and bottom edges of a two way light guide which permits the light to exit both the front and rear surface of the light guide. The top LEDs are preferably placed in thermal communication with a top thermal plate which is placed in conductive thermal communication with the rear glass. Similarly, the bottom LEDs are preferably placed in thermal communication with a bottom thermal plate which is also placed in conductive thermal communication with the rear glass. The top and bottom thermal plates permit the heat to spread out and transfer to the rear glass where it can be removed by forced or natural convection.

The foregoing and other features and advantages of the present invention will be apparent from the following more detailed description of the particular embodiments, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which.

DETAILED DESCRIPTION

Figure 1:
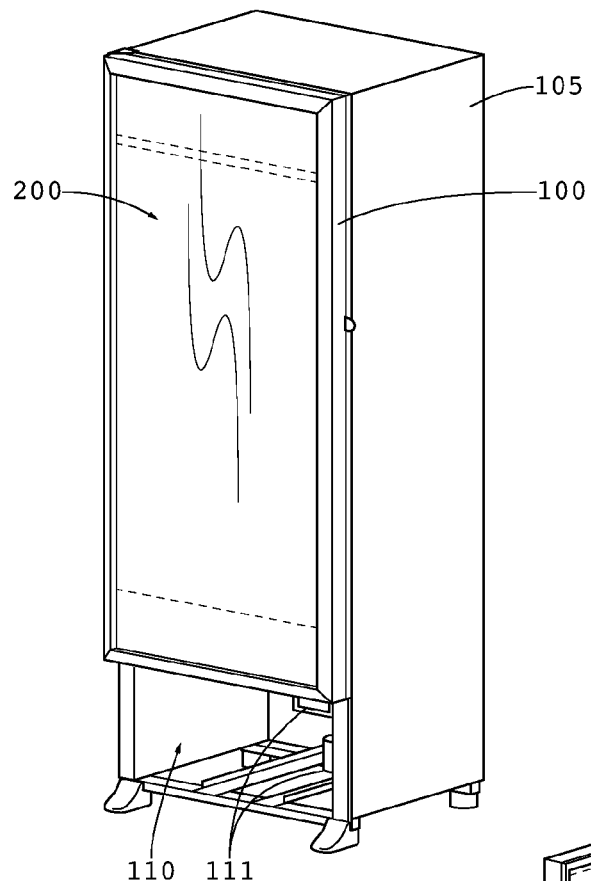
FIG. 1 is a perspective view of a display case having an exemplary sealed transparent LCD assembly.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a perspective view of a display case having an exemplary sealed transparent LCD assembly 200. Generally, the display case includes a housing 105, to which a door frame assembly 100 is fastened. In this embodiment, a cavity 110 is provided below the door frame assembly 100 where various electronic devices 111 for operating the transparent LCD assembly 200 can be located. The electrical devices 111 may include any or all of the following: timing and control board (TCON), video player, hard drive/storage, microprocessor/CPU, wireless transmitter/receiver, cellular data transmitter/receiver, and internet connectivity. At least some of the electrical devices 111 are in electrical communication with the transparent LCD 230.

Figure 2:
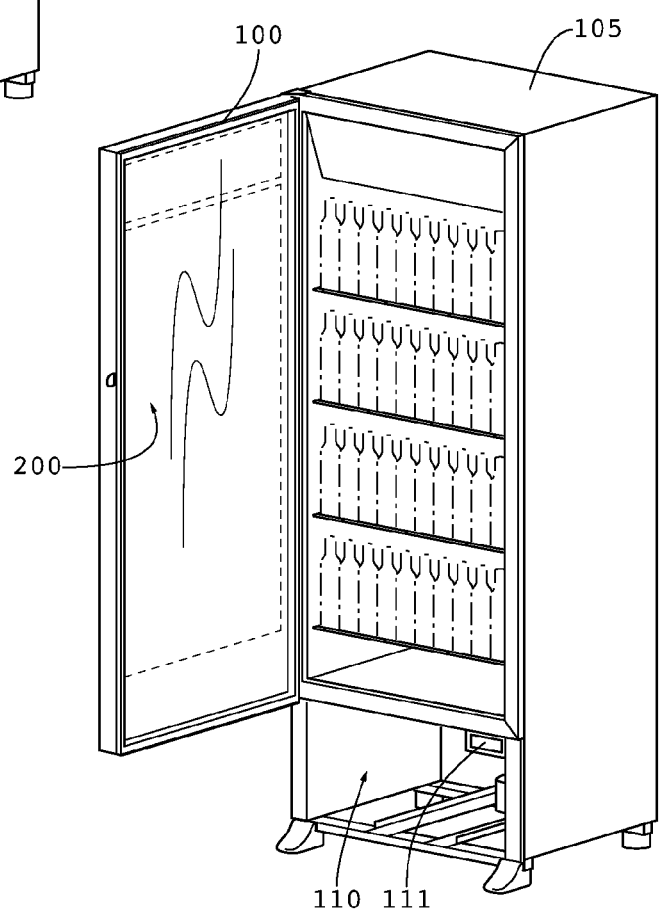
FIG. 2 is a perspective view of the display case of FIG. 1 where the door has been opened.

FIG. 2 is a perspective view of the display case of FIG. 1 where the door has been opened.

Figure 3:
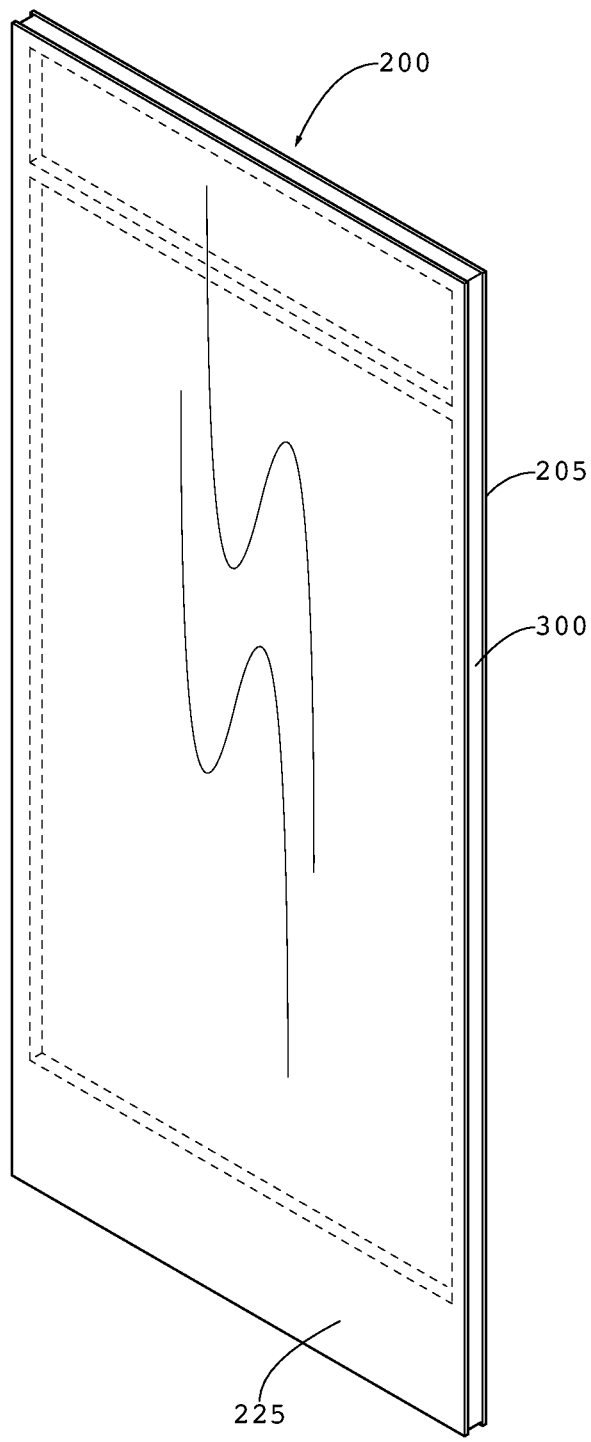
FIG. 3 is a perspective view of the sealed transparent LCD assembly of FIGS. 1-2.

FIG. 3 is a perspective view of the sealed transparent LCD assembly 200 of FIGS. 1-2. Generally speaking, the assembly includes a spacer 300 which is sandwiched between a front glass 225 and rear glass 205. These components are preferably sealed together with an inert gas filling the sealed enclosure. Although not required for every embodiment, argon gas has been found to be preferred in the exemplary embodiments. For sealing these components together, it is preferable to use a hot melt polyurethane. Preferably, the spacer 300 is the Super Spacer® Standard from Quanex in Cambridge, Ohio. www.quanex.com. In an exemplary embodiment, the spacer 300 would be a flexible foam that contains a desiccant and has a pressure sensitive acrylic adhesive on the front and back edges of the spacer which would be used to bond with the front and rear glass.

Figure 4:
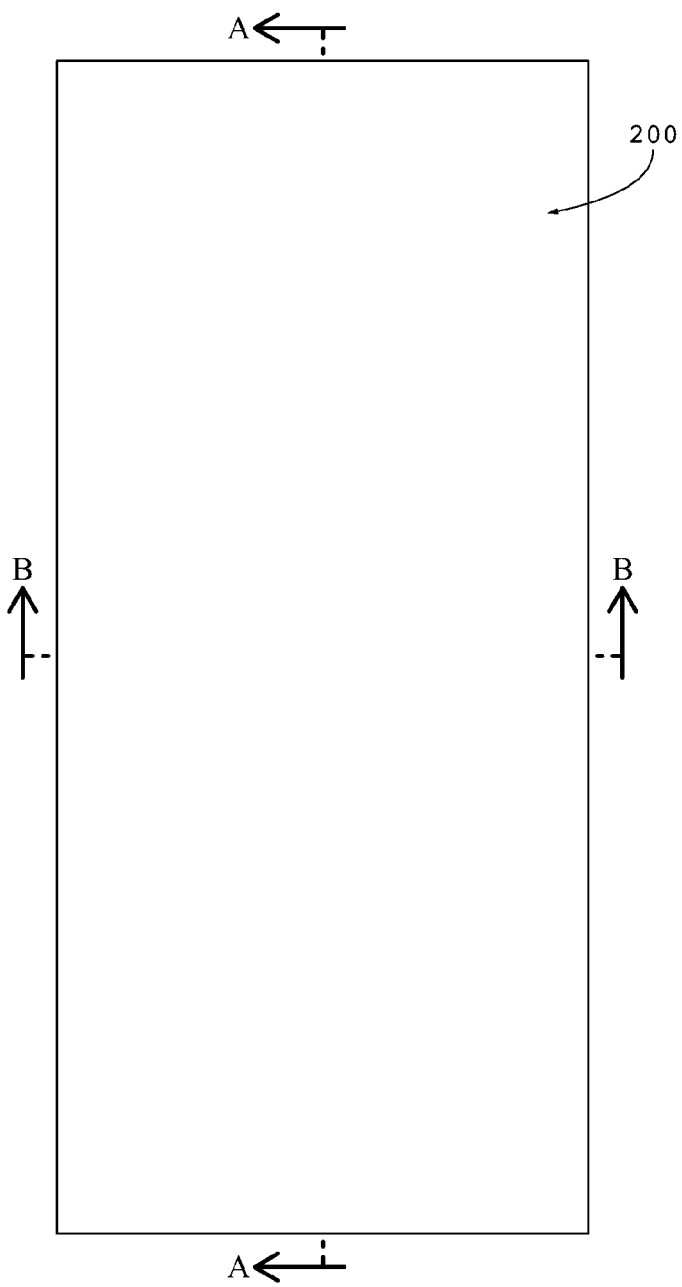
FIG. 4 is a front planar view of the sealed transparent LCD assembly, showing the section lines A-A and B-B.
Figure 5:
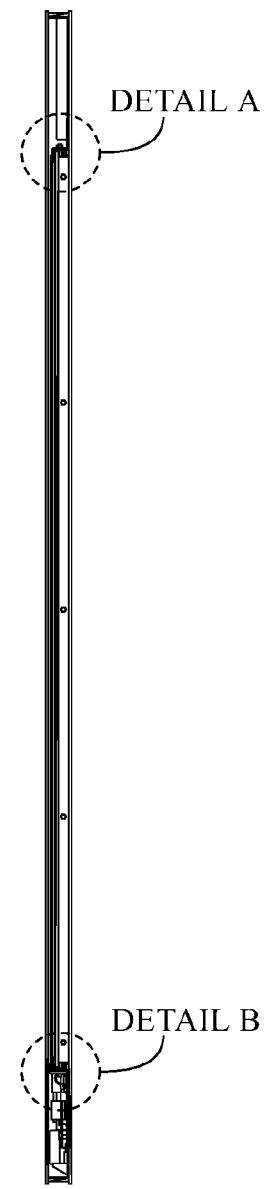
FIG. 5 is a section view taken along the section line A-A shown in FIG. 4 and indicating Detail A and Detail B.
Figure 6:
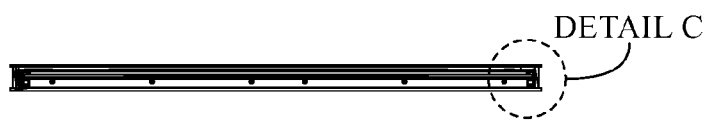
FIG. 6 is a section view taken along the section line B-B shown in FIG. 4 and indicating Detail C.

FIG. 4 is a front planar view of the sealed transparent LCD assembly, showing the section lines A-A and B-B. FIG. 5 is a section view taken along the section line A-A shown in FIG. 4 and indicating Detail A and Detail B. FIG. 6 is a section view taken along the section line B-B shown in FIG. 4 and indicating Detail C.

Figure 7:
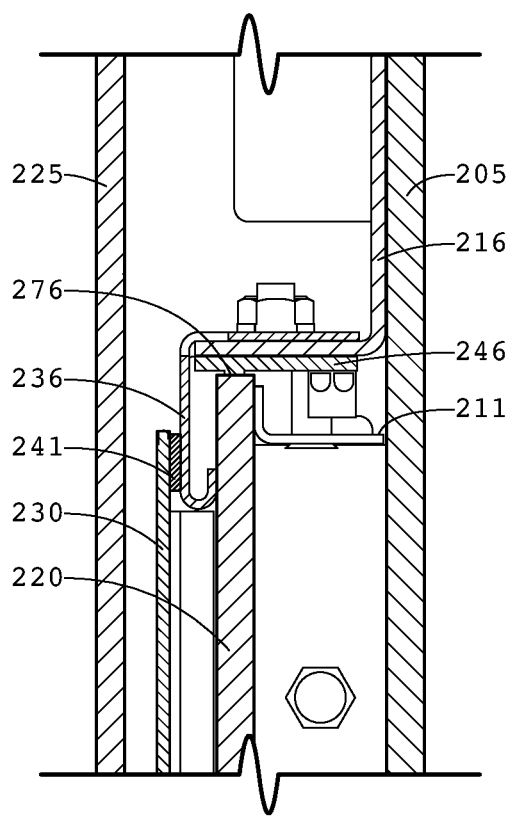
FIG. 7 is a detailed section view of Detail A shown in FIG. 5.

FIG. 7 is a detailed section view of Detail A shown in FIG. 5. A top thermal plate 216 is preferably bonded to the rear glass 205. In an exemplary embodiment, the top thermal plate 216 is preferably bonded to the rear glass 205 through adhesive transfer tape. An exemplary adhesive transfer tape for this purpose would be 468 MP, available commercially from 3M™ of St. Paul, Minn. www.3M.com/converter. A printed circuit board (PCB) 246 containing a plurality of LEDs 276 is preferably attached to the top thermal plate 216 and is preferably in conductive thermal communication with the top thermal plate 216 as well. In this way, heat that is generated by the LEDs 276 can be transmitted to the PCB 246, top thermal plate 216, and eventually transferring to the rear glass 205 where the heat can dissipate through natural or forced convection.

The LEDs 276 are placed adjacent to the edge of a light guide 220 which is sandwiched between a rear bracket 211 and a front bracket 236. Generally speaking, the light guide 220 is only constrained from movement towards the front or back of the assembly, but is not constrained from movement towards the top or sides of the assembly. In other words, the light guide 220 is secured such that it is capable of thermal expansion/contraction in the X-Y direction (horizontal and vertical when observing the LCD), but is fixed in the Z direction (into/out of the assembly when observing the LCD). It could also be said that the light guide 220 is constrained so that it cannot move towards the front or rear glass but otherwise is permitted to float between the rear bracket 211 and front bracket 236. In an exemplary embodiment, the light guide 220 would be the Acrylite® LED Endlighten product available from Evonik Industries. www.acrylite-shop.com.

Preferably, the light guide 220 would contain microscopic diffuse particulate that is homogeneously scattered throughout the sheet. Also preferably, the light emitted from the LEDs 276 and 275 is permitted to exit both the front and rear surfaces of the light guide 220 (in this way, the light guide 220 could be referred to as a 'two way light guide'). In an exemplary embodiment, the light is permitted to exit the rear of the light guide 220 so as to illuminate the products within the display case. Thus, it is preferable that the amount of light permitted to exit the rear surface of the light guide 220 is at least 20% of the amount of light permitted to exit the front surface of the light guide 220.

The transparent LCD 230 is preferably attached to a front surface of the front bracket 236 through a layer of adhesive 241 which would preferably be applied around the perimeter of the LCD 230. In an exemplary embodiment, the adhesive 241 would be VHB tape and preferably 5052 VHB Tape available commercially from 3M™ of St. Paul, Minn. www.3M.com.

Figure 8:
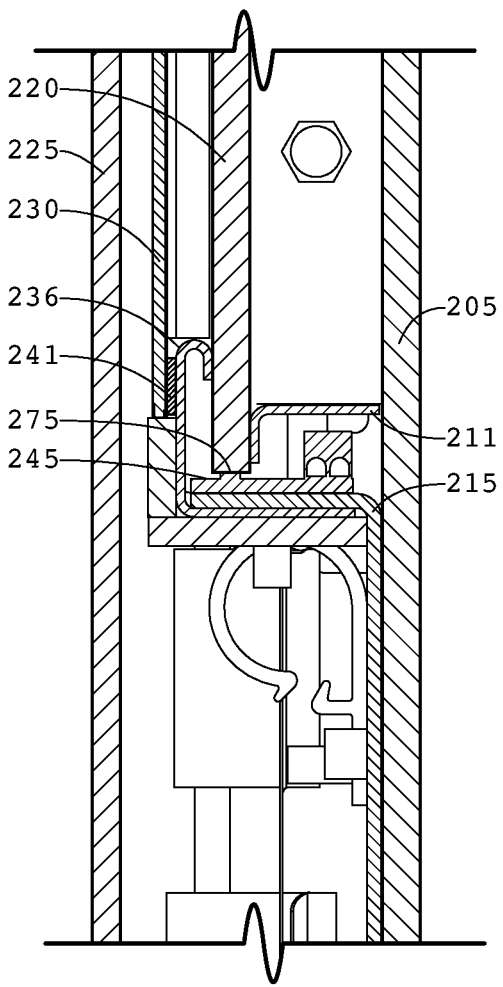
FIG. 8 is a detailed section view of Detail B shown in FIG. 5.

FIG. 8 is a detailed section view of Detail B shown in FIG. 5. A bottom thermal plate 215 is preferably bonded to the rear glass 205. In an exemplary embodiment, the bottom thermal plate 215 is preferably bonded to the rear glass 205 through adhesive transfer tape. An exemplary adhesive transfer tape for this purpose would be 468 MP, available commercially from 3M™ of St. Paul, Minn. www.3M.com/converter. A printed circuit board (PCB) 245 containing a plurality of LEDs 275 is preferably attached to the bottom thermal plate 215 and is preferably in conductive thermal communication with the bottom thermal plate 215 as well. In this way, heat that is generated by the LEDs 275 can be transmitted to the PCB 245, bottom thermal plate 215, and eventually transferring to the rear glass 205 where the heat can dissipate through natural or forced convection.

The LEDs 275 are placed adjacent to the edge of a light guide 220 which is sandwiched between a rear bracket 211 and a front bracket 236. As discussed at length above, the light guide 220 is preferably only constrained from movement towards the front or back of the assembly, but is not contained from movement towards the top or sides of the assembly.

Figure 9:
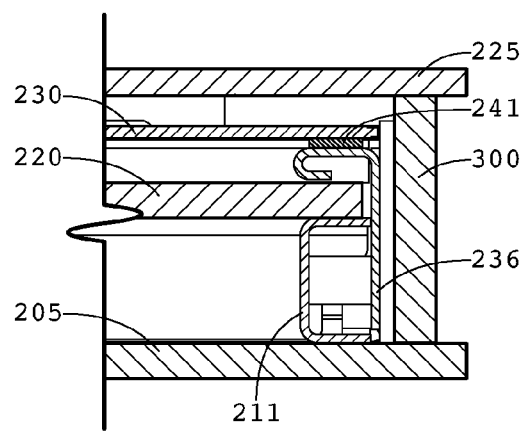
FIG. 9 is a detailed section view of Detail C shown in FIG. 6.

FIG. 9 is a detailed section view of Detail C shown in FIG. 6.

Figure 10:
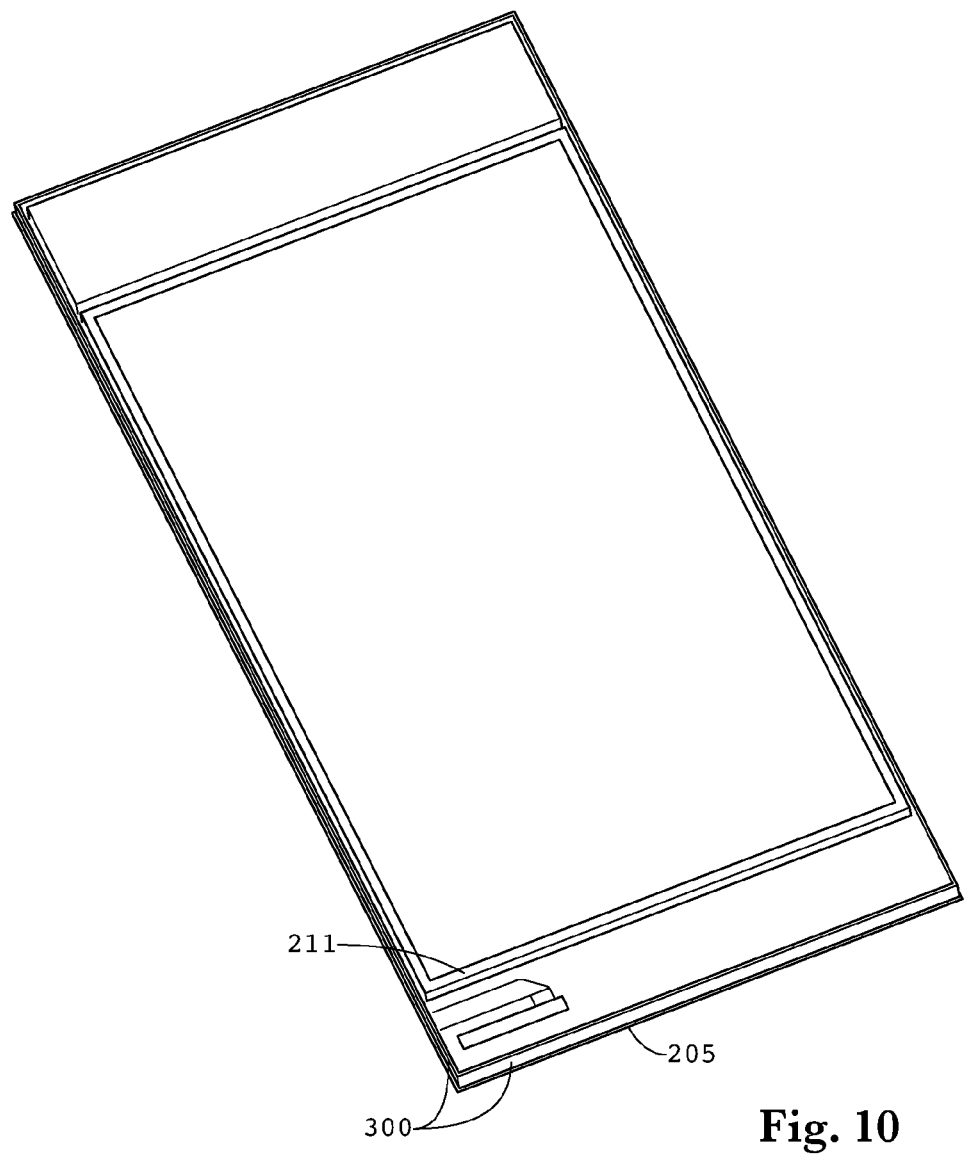
FIG. 10 is a perspective view of a partially assembled exemplary embodiment of a sealed transparent LCD assembly.

FIG. 10 is a perspective view of a partially assembled exemplary embodiment of a sealed transparent LCD assembly. This view shows the rear glass 205 with the spacer 300 attached around the perimeter of the glass 205. Also shown is the rear bracket 211 which may be attached to the rear glass 205 as well.

Figure 11:
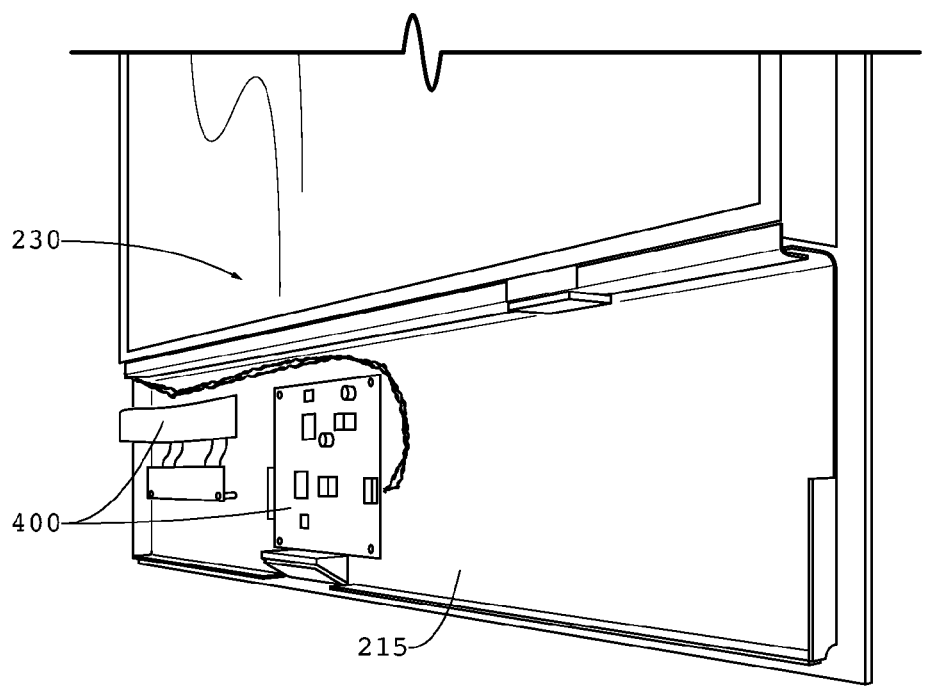
FIG. 11 is a simplified partial view of an exemplary embodiment of the lower thermal plate.

FIG. 11 is a simplified partial view of an exemplary embodiment of the lower thermal plate 215. In a preferred embodiment, the lower thermal plate 215 would extend horizontally as far as possible, preferably to the same horizontal width as the LCD 230 and may extend 4-14 inches in vertical width, depending on the application. In this embodiment, electrical devices 400 are mounted to the thermal plate 215 and can include, but are not limited to: power modules, wireless or satellite receiver/transmitter, video player, hard drive, microprocessor, and printed circuit boards. Although shown attached to the lower thermal plate 215, electrical devices 400 could also be mounted to the upper thermal plate 216. Preferably, the electrical devices 400 are also in conductive thermal communication with the thermal plate 215/216 so that heat which is generated by the electrical devices 400 can be transferred to the thermal plate 215/216 and eventually to the rear glass 205, where it can be removed by natural or forced convection.

Figure 12:
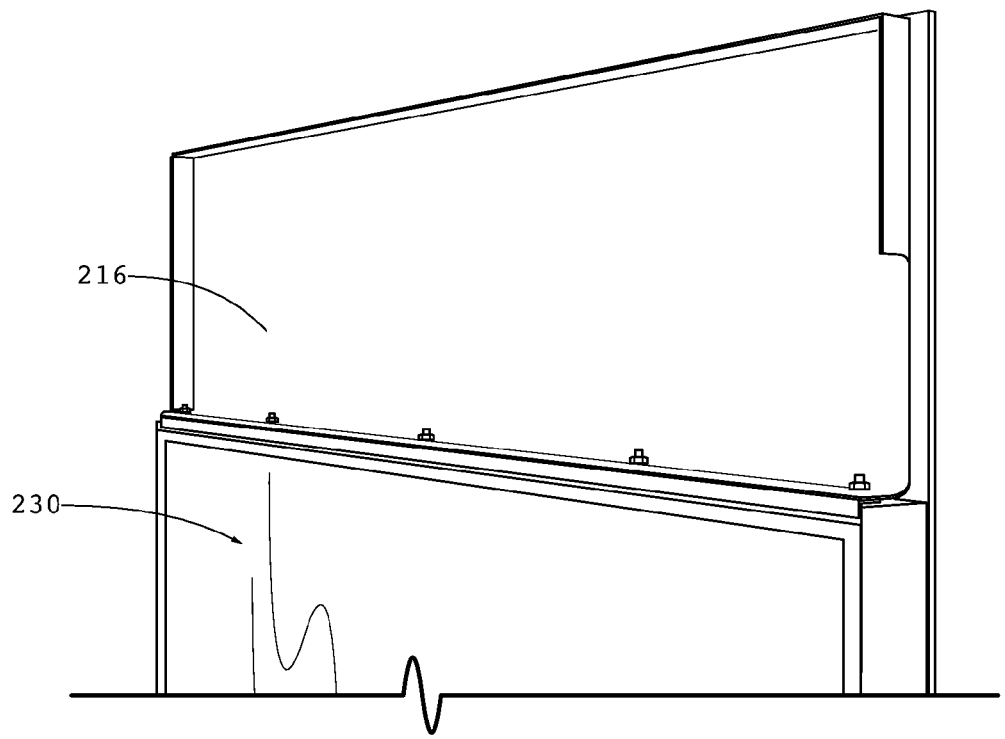
FIG. 12 is a simplified partial view of an exemplary embodiment of the upper thermal plate.

FIG. 12 is a simplified partial view of an exemplary embodiment of the upper thermal plate. Again, in a preferred embodiment, the upper thermal plate 216 would extend horizontally as far as possible, preferably to the same horizontal width as the LCD 230. The upper thermal plate 216 may also extend 4-14 inches in vertical width, depending on the application. While not required, it is also preferred that the lower thermal plate 215 and the upper thermal plate 216 are within 15% of the same surface area. In other words, it is preferred that the plates 215/216 are substantially the same surface area. This is not required, however, as some embodiments may require a larger surface area for the plate which would contain the electrical devices 400, or a larger surface area for the top plate 216 as compared to the bottom plate 215. It is preferred that the thermal plates are both metallic, and most preferably aluminum, but they can be any material that has good thermal conductivity.

The embodiments of the cooling system described herein can be used with any number of display case designs, either temperature controlled or not, and with doors that open, or glass that remains stationary. Although shown here with a transparent LCD, the cooling system could be used with a traditional backlit LCD as well.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

We claim:

1. A transparent liquid crystal display (LCD) assembly comprising:
   a glass panel;
   an LCD panel placed in front of the glass panel;
   a light guide positioned between the LCD panel and the glass panel, the light guide having an edge;
   a substrate containing a plurality of LEDs placed adjacent to the edge of the light guide; and
   a thermal plate attached to the glass panel as well as the substrate wherein the thermal plate contains a first portion attached to the glass panel and a second portion attached to the substrate where the first portion is substantially perpendicular to the second portion.

2. The transparent LCD assembly of claim 1 wherein:
   the thermal plate is in conductive thermal communication with the glass panel as well as the substrate.

3. The transparent LCD assembly of claim 1 wherein:
   the thermal plate is attached to the rear glass by adhesive transfer tape.

4. The transparent LCD assembly of claim 1 wherein:
   the substrate containing the LEDs is positioned substantially perpendicular to the rear glass.

5. The transparent LCD assembly of claim 1 further comprising:
   an electronic component for operating the LCD placed in electrical connection with the LCD and attached to the thermal plate.

6. The transparent LCD assembly of claim 1 further comprising:
   a front bracket contacting a front surface of the light guide; and
   a rear bracket contacting a rear surface of the light guide.

7. The transparent LCD assembly of claim 6, wherein:
   the front bracket only contacts the front surface of the light guide and the rear bracket only contacts the rear surface of the light guide.

8. The transparent LCD assembly of claim 1, wherein:
   the LCD panel is adhered to the front bracket.

9. The transparent LCD assembly of claim 1, wherein:
   the light guide is a two way light guide.

10. The transparent LCD assembly of claim 9, wherein:
    the light guide is configured such that the amount of light permitted to exit the rear surface of the light guide is at least 20% of the amount of light permitted to exit the front surface of the light guide.

11. The transparent LCD assembly of claim 1, wherein:
    the light guide is constrained from movement towards or away from an intended viewer but is permitted to move vertically.

12. A transparent LCD assembly comprising:
    a rear glass panel;
    an LCD panel placed in front of the rear glass panel;
    a printed circuit board (PCB) containing a plurality of LEDs placed near the LCD panel; and
    a thermal plate having a first portion attached to the PCB and a second portion attached to the rear glass panel wherein the first portion of the thermal plate is substantially perpendicular to the second portion.

13. The transparent LCD assembly of claim 12, wherein:
    the thermal plate is metallic.

14. The transparent LCD assembly of claim 12, wherein:
    the second portion of the thermal plate is substantially parallel to the rear glass panel and the first portion of the thermal plate is substantially perpendicular to the second portion.

15. A transparent liquid crystal display (LCD) assembly comprising:
    a front glass panel;
    a rear glass panel;
    a spacer sandwiched between the first and second glass panels to define a cavity;
    an LCD panel placed within the cavity;
    a light guide placed within the cavity and behind the LCD panel, the light guide having a top and bottom portion;
    a first substrate containing a plurality of LEDs and placed adjacent to the top portion of the light guide;
    a top thermal plate attached to the rear glass panel as well as the first substrate;
    a second substrate containing a plurality of LEDs and placed adjacent to the bottom portion of the light guide; and
    a bottom thermal plate attached to the rear glass panel as well as the second substrate wherein the top and bottom thermal plates each contain a first portion which is substantially parallel to the rear glass panel and the second portion which is substantially perpendicular to the first portion.

16. The transparent LCD assembly of claim 15 wherein:
    the top thermal plate and bottom thermal plate are substantially the same width as the LCD panel.

17. The transparent LCD assembly of claim 15 wherein:
    the spacer provides a gaseous seal between the front glass panel and the rear glass panel.

* * * * *